(12) United States Patent
Hurwitz et al.

(10) Patent No.: US 11,363,130 B2
(45) Date of Patent: Jun. 14, 2022

(54) CONTEXT AWARE AIRPLANE MODE

(71) Applicant: Google LLC, Mountain View, CA (US)

(72) Inventors: Jonathan D. Hurwitz, Cupertino, CA (US); Justin Lee, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/296,472

(22) PCT Filed: Aug. 16, 2019

(86) PCT No.: PCT/US2019/046861
§ 371 (c)(1),
(2) Date: May 24, 2021

(87) PCT Pub. No.: WO2021/034305
PCT Pub. Date: Feb. 25, 2021

(65) Prior Publication Data
US 2022/0030103 A1  Jan. 27, 2022

(51) Int. Cl.
*H04M 1/72454* (2021.01)
*H04L 67/143* (2022.01)
*H04W 4/80* (2018.01)
*H04M 1/72463* (2021.01)

(52) U.S. Cl.
CPC ...... *H04M 1/72454* (2021.01); *H04L 67/143* (2013.01); *H04M 1/72463* (2021.01); *H04W 4/80* (2018.02)

(58) Field of Classification Search
CPC ......... H04M 1/72454; H04M 1/72463; H04W 4/80; H04L 67/13
See application file for complete search history.

(56) References Cited

U.S. PATENT DOCUMENTS

| | | | | |
|---|---|---|---|---|
| 2011/0241827 A1* | 10/2011 | Varoglu | ................ | H04B 7/185 340/5.52 |
| 2014/0187222 A1* | 7/2014 | Lai | ......................... | H04W 8/22 455/418 |
| 2015/0199616 A1* | 7/2015 | Rajendraprasad | ..... | G06N 20/00 706/12 |

(Continued)

FOREIGN PATENT DOCUMENTS

CN  107040643 A  8/2017

OTHER PUBLICATIONS

Response to Communication Pursuant to Rules 161(1) and 162 EPC dated Jun. 7, 2021, from counterpart European Application No. 19762540.3, filed Nov. 23, 2021, 3 pp.

(Continued)

*Primary Examiner* — David Bilodeau
(74) *Attorney, Agent, or Firm* — Shumaker & Sieffert, P.A.

(57) ABSTRACT

An example method includes, responsive to receiving user input to activate an airplane mode of a mobile computing device: disabling a first wireless protocol; determining, based on activity of a media session, whether to maintain an enabled state of a second wireless protocol of the mobile computing device, wherein the mobile computing device is configured to stream audio data associated with the media session to an audio sink device via a second wireless protocol; and selectively maintaining the enabled state of the second wireless protocol based on the determination.

20 Claims, 3 Drawing Sheets

(56) References Cited

U.S. PATENT DOCUMENTS

| | | | |
|---|---|---|---|
| 2016/0227600 A1* | 8/2016 | Shedletsky | H04M 1/72463 |
| 2019/0014205 A1* | 1/2019 | Miloseski | G06F 3/0482 |
| 2019/0149652 A1* | 5/2019 | Rodriguez Bravo | H04W 48/04 |
| | | | 455/418 |
| 2021/0099839 A1* | 4/2021 | Chiu | H04M 1/72463 |

OTHER PUBLICATIONS

International Search Report and Written Opinion of International Application No. PCT/US2019/046861, dated Apr. 28, 2020, 20 pp.
Youtube, "Guide: Make Android's "airplane mode" smarter," by Android Police, posted Jul. 18, 2016, retrieved from https://www.youtube.com/watch?v=YZsVH2WrFIQ, May 21, 2021, 1 pp.
International Preliminary Report on Patentability from International Application No. PCT/US2019/046861, dated Mar. 3, 2022, 8 pp.

* cited by examiner

CONTEXT AWARE AIRPLANE MODE

This application is a 371 application of International Patent Application No. PCT/US2019/046861, filed 16 Aug. 2019, the entire contents of which is incorporated herein

BACKGROUND

Some computing devices may be capable of wirelessly communicating with other devices. However, in certain situations, it may not be desirable for a computing device to transmit wireless signals. For instance, when the computing device is being used on an aircraft, it may not be desirable for the computing device to transmit wireless signals so as to avoid the transmitted signals interfering with the operation of systems of the aircraft. As such, a computing device may be configured to selectively operate in an airplane mode in which the computing device may not transmit wireless signals.

SUMMARY

In general, techniques of this disclosure are directed to techniques for selectively persisting certain wireless protocols when airplane mode is activated. An example mobile computing device may be capable of communicating (i.e., transmitting and receiving signals) via several different wireless protocols (e.g., Wi-Fi, BLUETOOTH, and/or cellular (e.g., 3G, 4G, LTE, 5G-E, 5G, etc.)). The mobile computing device may utilize the wireless protocols for different purposes. For instance, the mobile computing device may use a relatively higher transmit power wireless protocol (e.g., a cellular protocol) to communicate over long distances, such as to download files from the Internet, and may use a relatively lower transmit power wireless protocol (e.g., BLUETOOTH) to communicate over short distances, such as to stream audio data to headphones. Typically, when airplane mode is activated, the mobile computing device will disable communication via all wireless protocols. However, disabling communication via certain wireless protocols may be disruptive to the user of the mobile computing device. For instance, where the mobile computing device is streaming audio data to wireless headphones via a first wireless protocol, disabling communication via the first wireless protocol may terminate the streaming of audio data.

In accordance with one or more techniques of this disclosure, a mobile computing device may selectively persist communications via a subset of wireless protocols when airplane mode is activated. For instance, responsive to receiving user input to activate an airplane mode of the mobile computing device, the mobile computing device may disable a first wireless protocol (e.g., cellular) and may selectively disable a second wireless protocol (e.g., BLUETOOTH). The mobile computing device may be configured to stream audio data associated with a media session to an audio sink device via the second wireless protocol and may perform the selective disabling of the second protocol based on activity of the media session. For instance, if the media session is active when airplane mode is activated, the mobile computing device may maintain an enabled state (i.e., not disable) of the second protocol. By maintaining the enabled state of the second protocol, the mobile computing device may avoid disrupting the streaming of audio data and/or having the user manually re-activate the second protocol. In this way, the techniques of this disclosure enable the mobile computing device to avoid the complexities of manual re-activation of the second protocol and re-establishment of a connection with the audio sink device.

In one example, a method includes, responsive to receiving user input to activate an airplane mode of a mobile computing device: disabling a first wireless protocol; determining, based on activity of a media session, whether to maintain an enabled state of a wireless protocol of the mobile computing device, wherein the mobile computing device is configured to stream audio data associated with the media session to an audio sink device via a second wireless protocol; and selectively maintaining the enabled state of the second wireless protocol based on the determination.

In another example, a mobile computing device includes a wireless communication unit; one or more processors; and at least one non-transitory computer-readable storage medium storing instructions that are executable by the one or more processors to: receive user input to activate an airplane mode; responsive to receiving the user input, disable a first wireless protocol; determine, based on activity of a media session, whether to maintain an enabled state of a wireless protocol of the mobile computing device, wherein the mobile computing device is configured to stream audio data associated with the media session to an audio sink device via a second wireless protocol using the wireless communication unit; and selectively maintain the enabled state of the second wireless protocol based on the determination.

In another example, a non-transitory computer-readable storage medium storing instructions that, when executed, cause one or more processors of a device to: receive user input to activate an airplane mode; responsive to receiving the user input, disable a first wireless protocol; determine, based on activity of a media session, whether to maintain an enabled state of a wireless protocol of the mobile computing device, wherein the mobile computing device is configured to stream audio data associated with the media session to an audio sink device via a second wireless protocol using the wireless communication unit; and selectively maintain the enabled state of the second wireless protocol based on the determination.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
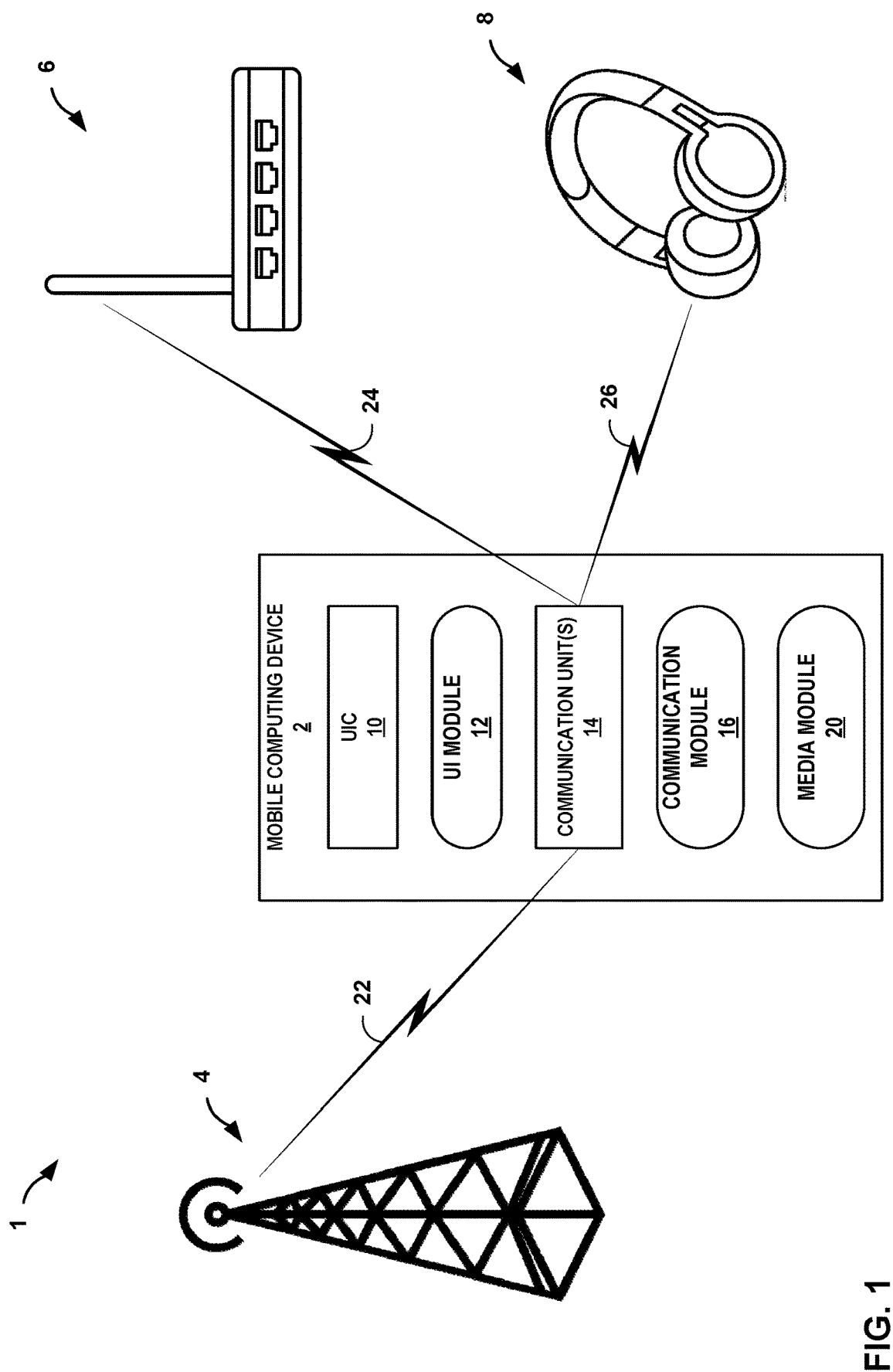
FIG. 1 is a conceptual diagram illustrating an example system including a mobile computing device capable of communicating via a plurality of wireless communication protocols, in accordance with one or more aspects of the present disclosure.

FIG. 1 is a conceptual diagram illustrating an example system 1 including mobile computing device 2 capable of communicating via a plurality of wireless communication protocols. As shown in FIG. 1, system 1 includes mobile computing device 2, cellular access point 4, Wi-Fi access point 6, and media sink device 8. System 1, in other examples, may also include other devices, such as a server device, a network, or other devices.

In the example of FIG. 1, mobile computing device 2 can be a mobile phone. However, mobile computing device 2 may also be any other type of computing device such as a camera device, a tablet computer, a personal digital assistant (PDA), a smart speaker, a laptop computer, a desktop computer, a gaming system, a media player, an e-book reader, a television platform, an automobile navigation system, or a wearable computing device (e.g., a computerized watch, a head mounted device such as a VR/AR headset, computerized eyewear, a computerized glove). As shown in FIG. 1, mobile computing device 2 includes user interface component (UIC) 10, UI module 12, communication units 14, communication module 16, and media module 20.

UIC 10 may function as respective input and/or output devices for mobile computing device 2. UIC 10 may be implemented using various technologies. For instance, UIC 10 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. UIC 10 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of mobile computing device 2.

UIC 10 may detect input (e.g., touch and non-touch input) from a user of respective mobile computing device 2. UIC 10 may detect indications of input by detecting one or more gestures from a user (e.g., the user touching, pointing, and/or swiping at or near one or more locations of UIC 10 with a finger or a stylus pen). UIC 10 may output information to a user in the form of a user interface, which may be associated with functionality provided by mobile computing device 2. Such user interfaces may be associated with computing platforms, operating systems, applications, and/or services executing at or accessible from mobile computing device 2 (e.g., electronic message applications, chat applications, Internet browser applications, mobile or desktop operating systems, social media applications, electronic games, menus, and other types of applications). For example, UIC 10 may present a user interface that includes an airplane mode status icon.

UI module 12 manages user interactions with UIC 10 and other components of mobile computing device 2. In other words, UI module 12 may act as an intermediary between various components of mobile computing device 2 to make determinations based on user input detected by UIC 10 and generate output at UIC 10 in response to the user input. UI module 12 may receive instructions from an application, service, platform, or other module of mobile computing device 2 to cause UIC 10 to output a user interface. UI module 120 may manage inputs received by mobile computing device 2 as a user views and interacts with the user interface presented at UIC 10 and update the user interface in response to receiving additional instructions from the application, service, platform, or other module of mobile computing device 2 that is processing the user input.

One or more communication units 14 of mobile computing device 2 may communicate with external devices via one or more wired and/or wireless networks by transmitting and/or receiving network signals on the one or more networks. Examples of communication units 14 include a network interface card (e.g. such as an Ethernet card), an optical transceiver, a radio frequency transceiver, a GPS receiver, or any other type of device that can send and/or receive information. Other examples of communication units 14 may include short wave radios, cellular data radios, wireless network radios (e.g., Wi-Fi radios, BLUETOOTH radios, etc.), as well as universal serial bus (USB) controllers.

Communication module 16 may perform various operations to manage communications between mobile computing device 2 and external devices. As one example, communication module 16 may receive data from one or more components of mobile computing device 2, and cause one or more of communication units 14 to wirelessly transmit a representation of the data to an external device. As another example, communication module 16 may receive data from one or more of communication units 14 that has been wirelessly received from an external device.

As shown in FIG. 1, communication module 10 and communication units 14 may enable mobile computing device 2 to wirelessly communicate with cellular access point 4, Wi-Fi access point 6, and/or media sink device 8 via a variety of wireless protocols. For instance, communication module 10 and communication units 14 may communicate with cellular access point 4 via a cellular protocol over link 22, communicate with Wi-Fi access point 6 via a Wi-Fi protocol over link 24, and communicate with media sink device 8 via a personal area network (PAN) protocol (e.g., BLUETOOTH or other wireless transport protocol) over link 26.

Media module 20 may perform various operations to manage the playback of media. For instance, media module 20 may manage a media session through which media data may be played back. The media may be played back via one or more output devices of mobile computing device 2 (e.g., UIC 10) or via one or more output devices of an external device (e.g., media sink device 8). For instance, media module 20 may manage a media session through which an app executing at mobile computing device 2 may stream media data (e.g., audio data, video data, or a combination of audio and video data) for playback by media sink device 8 via link 26. Media module 20 may manage the media session to have a number of states. As one example, the media session may be in an active state where media is actively being played back or where the playback of media is paused. As another example, the media session may be inactive where no media is being played back.

Mobile computing device 2 may include modules 12, 16, and 20. Modules 12, 16, and 20 may perform operations described using software, hardware, firmware, or a mixture of hardware, software, and/or firmware residing in and/or executing at mobile computing device 2. Mobile computing device 2 may execute modules 12, 16, and 20 with one or more processors. Mobile computing device 2 may execute modules 12, 16, and 20 as a virtual machine executing on underlying hardware. Modules 12, 16, and 20 may execute as a service or component of an operating system or computing platform. Modules 12, 16, and 20 may execute as one or more executable programs at an application layer of a computing platform. Modules 12, 16, and 20 may be otherwise arranged remotely to and remotely accessible to mobile computing device 2, for instance, as one or more network services operating at a network in a network cloud.

As discussed above, system 1 may include cellular access point 4, Wi-Fi access point 6, and media sink device 8. Examples of cellular access point 4 include, but are not necessarily limited to, cell towers, microcells, cell sites, or any other device capable of communicating via a cellular network (e.g., 3G, 4G, LTE, 5G-E, 5G, etc.). Examples of Wi-Fi access point 6 include, but are not necessarily limited to, residential access points, commercial access points, or any other device capable of communicating via a Wi-Fi network (e.g., any IEEE 802.11 network). One or both of cellular access point 4 and Wi-Fi access point 6 may facilitate communication between mobile computing device 2 and networks, such as the Internet.

In the example of FIG. 1, media sink device 8 can be a pair of wireless headphones. However, media sink device 8 may also be any other type of computing device such as a mobile phone, a vehicle, a wireless speaker, a camera device, a tablet computer, a personal digital assistant (PDA), a laptop computer, a gaming system, a media player, an e-book reader, a television platform, or a wearable computing device (e.g., a computerized watch, computerized eyewear, a computerized glove).

In operation, communication module 16 of mobile computing device 2 may negotiate and establish one or more links using a variety of wireless protocols. For instance, communication module 16 may negotiate and establish one or more of cellular link 22, Wi-Fi link 24, and BLUETOOTH link 26. Mobile computing device 2 may use any combination of the links to communicate (i.e., exchange data with) various external devices. For instance, a media session managed by media module 20 may stream media data to media sink device 8 via link 26. In other words, mobile computing device 2 may be configured to stream media data associated with the media session to media sink device 8 via link 26 using a wireless protocol, such as a BLUETOOTH protocol (e.g., one of the BLUETOOTH audio streaming profiles (A2DP, HFP, BLE audio, etc.)).

A user of mobile computing device 2 may desire to activate an airplane mode of mobile computing device 2 (e.g., when the user is boarding an aircraft). To activate the airplane mode, the user may provide user input to select an airplane mode activation icon (e.g., the user may tap the airplane mode activation icon) from a menu structure of a graphical user interface displayed at UIC 10. UI module 12 may receive an indication of the user input and provide the indication to communication module 16.

Responsive to receiving the indication, communication module 16 may activate the airplane mode of mobile computing device 2 by disabling one or more wireless protocols. For instance, communication module 16 may disable a cellular wireless protocol such that communication units 14 are prevented from transmitting wireless signals using the cellular wireless protocol. However, as discussed above, it may not be desirable for communication module 16 to disable all wireless protocols when airplane mode is activated.

In accordance with one or more techniques of this disclosure, when airplane mode is activated, communication module 16 may selectively maintain an enabled state of one or more wireless protocols based on activity of a media session associated with the one or more wireless protocols. For instance, communication module 16 may not disable a particular wireless protocol associated with a media session based on activity of the media session.

As one example, if the media session is active when airplane mode is activated, communication module 16 may maintain the enabled state (i.e., not disable) the particular wireless protocol in response to the activation of airplane mode. As another example, if the media session has been active within a threshold time from a time at which airplane mode is activated, communication module 16 may maintain the enabled state (i.e., not disable) the particular wireless protocol in response to the activation of airplane mode.

As another example, if the media session is predicted to be active in the future within a threshold time from a time at which airplane mode is activated, communication module 16 may maintain the enabled state of (i.e., not disable) the particular wireless protocol in response to the activation of airplane mode. By selectively maintaining the enabled state of the particular wireless protocol when airplane mode is activated, communication module 16 may avoid disrupting the streaming of media data and/or having the user manually re-activate the particular wireless protocol. In this way, the techniques of this disclosure enable mobile computing device 2 to avoid the complexities of manual re-activation of the particular protocol and re-establishment of a connection with media sink device 8.

Figure 2:
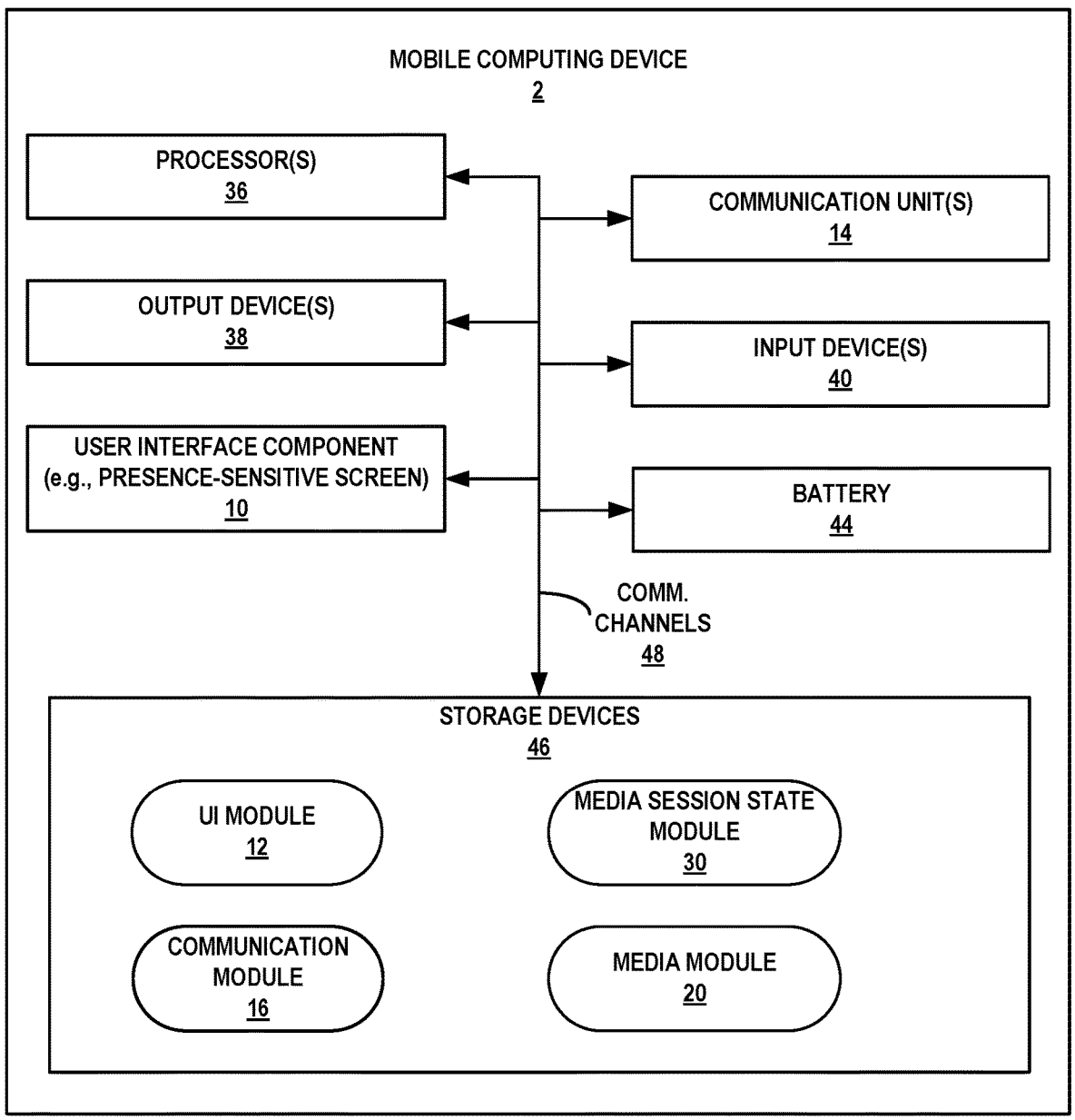
FIG. 2 is a block diagram illustrating an example mobile device configured to selectively refrain from disabling at least one wireless protocol in response to activation of airplane mode, in accordance with one or more aspects of the present disclosure.

FIG. 2 is a block diagram illustrating an example mobile device configured to selectively refrain from disabling at least one wireless protocol in response to activation of airplane mode, in accordance with one or more aspects of the present disclosure. Mobile computing device 2 of FIG. 2 is described below within the context of system 1 of FIG. 1. FIG. 2 illustrates only one particular example of mobile computing device 2 and many other examples of mobile computing device 2 may be used in other instances. In the example of FIG. 2, mobile computing device 2 may be a wearable computing device, a mobile computing device, or any other computing device capable of streaming media data. Mobile computing device 2 of FIG. 2 may include a subset of the components included in example mobile computing device 2 or may include additional components not shown in FIG. 2.

As shown in the example of FIG. 2, mobile computing device 2 includes user interface component 10 ("UIC 10"), one or more processors 36, one or more output devices 38, one or more input devices 40, one or more communication units 14, battery 44, and one or more storage devices 46. Storage devices 46 may also include UI module 12, communication module 16, media module 20, and media session state module 30.

Communication channels 48 may interconnect each of the components 10, 14, 36, 38, 40, 42, 44, and 46 for inter-component communications (physically, communicatively, and/or operatively). In some examples, communication channels 48 may include a power bus, a system bus, a network connection, an inter-process communication data structure, or any other method for communicating data or transferring power.

One or more output devices 38 may generate output. Examples of output are tactile, audio, and video output. Output devices 38, in one example, includes a presence-sensitive display, sound card, video graphics adapter card, speaker, cathode ray tube (CRT) monitor, liquid crystal display (LCD), or any other type of device for generating output to a human or machine.

One or more input devices 40 may receive input. Examples of input are tactile, audio, and video input. Input devices 40, in some examples, includes a presence-sensitive display, touch-sensitive screen, mouse, keyboard, voice responsive system, video camera, microphone, sensor, or any other type of device for detecting input from a human or machine.

One or more communication units 14 are similar to communication units 14 of FIG. 1 and may include some of all of the same features of communication units 14 of FIG. 1. For instance, communication units 14 may communicate with external devices via one or more wired and/or wireless networks by transmitting and/or receiving network signals on the one or more networks via a plurality of wireless protocols.

UIC 10 may include functionality of input devices 40 and/or output devices 38. In the example of FIG. 2, UIC 10 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 38, e.g., at a display.

One or more storage devices 46 within source mobile computing 2 may store information for processing during operation of mobile computing device 2 (e.g., mobile computing device 2 may store data (e.g., audio blocks and/or packets at data buffer 12) that modules 8, 10, and 13 access during execution at mobile computing device 2). In some examples, storage device 46 is a temporary memory, meaning that a primary purpose of storage device 46 is not long-term storage. Storage devices 46 on mobile computing device 2 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 46, in some examples, include one or more computer-readable storage media. Storage devices 46 may be configured to store larger amounts of information than volatile memory. Storage devices 46 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 46 may store program instructions and/or information (e.g., data) associated with modules 12, 16, 20, and 30.

One or more processors 36 may implement functionality and/or execute instructions within mobile computing device 2. For example, processors 36 on mobile computing device 2 may receive and execute instructions stored by storage devices 46 that execute the functionality of modules 12, 16, 20, and 30. Processors 36 may execute instructions of modules 12, 16, 20, and 30 to cause to perform various actions or functions of mobile computing device 2.

As discussed above, media module 20 may be executable by processors 36 to manage operation of a media session through which media may be played back via one or more of output devices 38 or via one or more output devices of an external device (e.g., media sink device 8). The media session may be used by various apps/applications executing at mobile computing device 2 to playback media. As one example, a music application may request that media module 20 create a media session for playback of music. As another example, a video application may request that media module 20 create a media session for playback of video and associated audio.

Media session state module 30 may be executable by processors 36 to determine a state of a media session managed by media module 20. Some example states of the media session that may be determined by media session state module 30 include, but are not limited to, recently active, currently active, and predicted to be active.

Media session state module 30 may determine that a media session is currently active where the media session is active at a present time. In some examples, media state session module 30 may determine that a media session is active where media is currently being played back via the media session. In some examples, media state session module 30 may determine that a media session is active where media is currently being played back via the media session or where the playback of media via the media session is paused.

Media session state module 30 may determine that a media session was recently active in response to determining that a time at which the media session was last active is within a threshold time of a present time. For instance, where the media session was last active at time $t_{last}$, media session state module 30 may determine that the media session was recently active where $t_{current} - t_{last}$ is less than a threshold amount of time (e.g., 30 seconds, 1 minute, 5 minutes, 10 minutes, etc.).

Media session state module 30 may determine that a media session is predicted to be active in response to determining that the media session is likely to be active in the near future. As one example, media session state module 30 may determine that the media session is likely to be active in the near future in response to predicting that a user of mobile computing device 2 will activate a media application next in their usage flow. For instance, where mobile computing device 2 maintains a list of applications predicted to be next opened by the user of mobile computing device 2, media session state module 30 may determine predict that the user will activate a media application next in their usage flow where the media application is included in a top N (e.g., 1, 2, 3, 4, 5, etc.) applications in the list. As another example, media session state module 30 may determine that the media session is likely to be active in the near future in response to predicting that a time at which the media session will next be active is within a threshold time of a present time. For instance, where the media session was last active at time $t_{last}$, media session state module 30 may determine that the media session was recently active where the absolute value of $t_{current} - t_{last}$ is less than a threshold amount of time (e.g., 30 seconds, 1 minute, 5 minutes, 10 minutes, etc.).

As discussed above and in accordance with one or more techniques of this disclosure, when airplane mode is activated, communication module 16 may selectively maintain an enabled state of a wireless protocol based on activity of a media session associated with the wireless protocol. For instance, when airplane mode is activated, communication module 16 may (e.g., always) disable a first sub-set of communication protocols (e.g., cellular) and selectively disable a second sub-set of communication protocols (e.g., Wi-Fi, BLUETOOTH, etc.) based on the activity of the media session.

In some examples, communication module 16 may further base the determination of whether to disable or maintain the enabled state of the second sub-set of communication protocols based on whether an audio sink device (e.g., USB, USB-C, or hardwired headphones or speakers) is connected to mobile computing device 2 (e.g., via a higher priority/order routing/connection than the second sub-set of communication protocols, which could be wired or wireless). For instance, responsive to determining that an audio sink device is connected to mobile computing device 2 when airplane mode is activated, communication module 16 may disable the second sub-set of communication protocols regardless of the activity of the media session.

Figure 3:
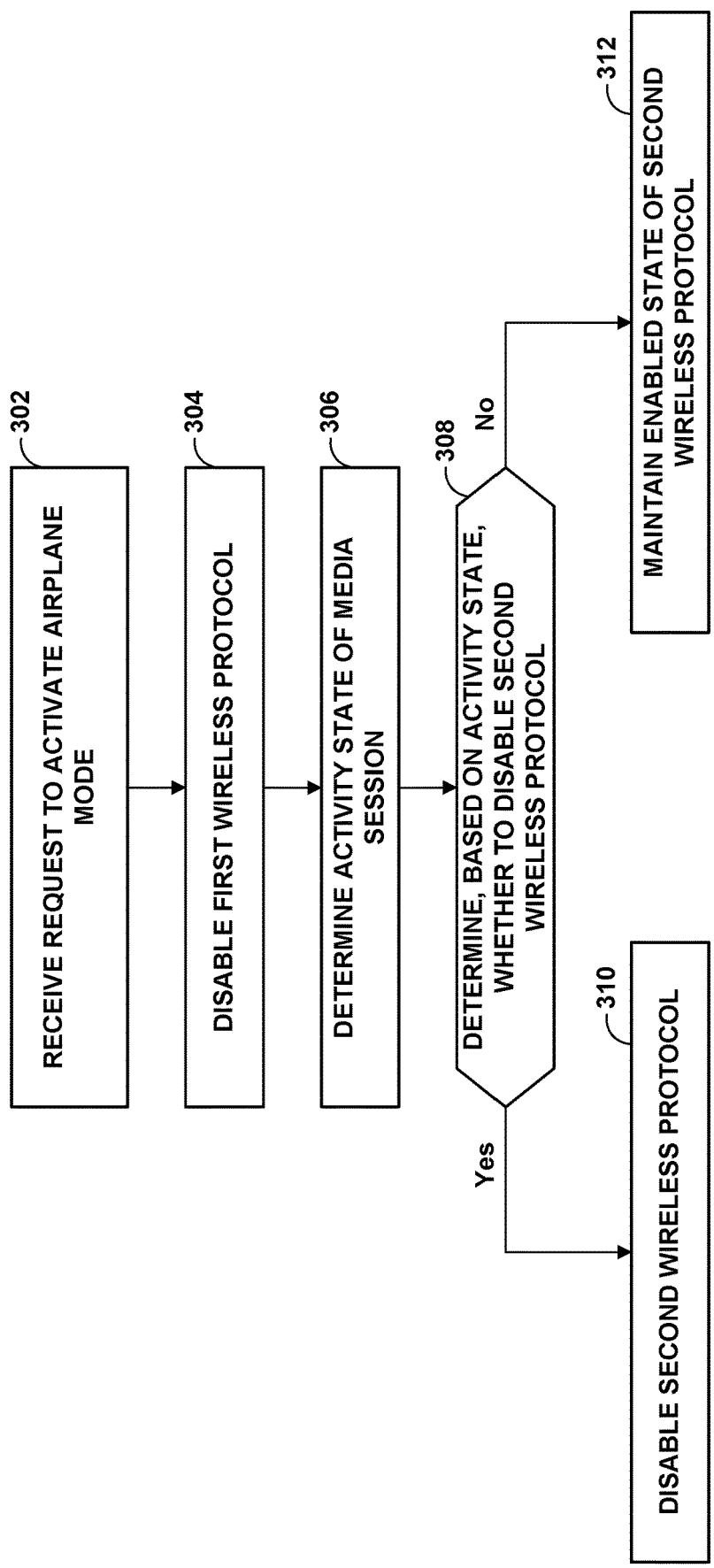
FIG. 3 is a flowchart illustrating example operations of an example mobile computing device configured to selectively refrain from disabling at least one wireless protocol in response to activation of airplane mode, in accordance with one or more aspects of the present disclosure.

FIG. 3 is a flowchart illustrating example operations of an example mobile computing device configured to selectively refrain from disabling at least one wireless protocol in response to activation of airplane mode, in accordance with one or more aspects of the present disclosure. The operations of mobile computing device 2 are described within the context of system 1 of FIG. 1, and mobile computing device 2 of FIG. 1 and FIG. 2.

Mobile computing device 2 may receive a request to activate airplane mode (302). For instance, a user of mobile computing device 2 may provide user input to select a menu item (e.g., an icon) of a graphical user interface displayed by UIC 10 of mobile computing device 2. UI module 12 may receive an indication of the user input and output a message to communication module 16 requesting activation of airplane mode.

Responsive to receiving the request to activate airplane mode, mobile computing device 2 may disable a first wireless protocol (304). For instance, responsive to receiving the message from UI module 12, communication module 16 may disable a cellular wireless protocol. When the first wireless protocol is disabled, mobile computing device 2 may refrain from transmitting wireless signals using the first wireless protocol.

As opposed to always disabling a second wireless protocol in response to receiving the request to activate airplane mode, mobile computing device 2 may selectively disable/maintain an enabled state of the second wireless protocol based on activity of a media session that may stream audio data to an audio sink device via the second wireless protocol. For instance, mobile computing device 2 may determine an activity state of the media session (306) and determine whether to disable or maintain an enabled state of the second wireless protocol based on the determined activity state (308). As discussed above, to determine the activity state of the media session, media session state module 30 may determine whether the media session was recently active, is currently active, is predicted to be active, or is not active. Responsive to determining that the media session is active, was recently active, and/or is predicted to be active, communication module 16 may determine to maintain the enabled state of the second wireless protocol ("No" branch of 308). Similarly, responsive to determining that the media session is not active, was not recently active, and/or is not predicted to be active, communication module 16 may determine to disable the second wireless protocol ("Yes" branch of 308).

As discussed above, in some examples, communication module 16 may make the determination of whether to disable the second wireless protocol in response to the request to activate airplane mode based on whether an audio sink device is connected to mobile computing device 2 via a hardwired connection. For instance, where an audio sink device (e.g., wired headphones) are connected to mobile computing device 2 via a hardwired connection (which can be direct or via dongle), communication module 16 may disable the second wireless protocol in response to the request to activate airplane mode regardless of the activity state of the media session.

As another example, communication module 16 may further base the determination on one or more signals received from an audio sink device. For instance, an audio sink device that includes headphones or earpieces, such as media sink device 8 of FIG. 1, may output a signal to mobile computing device 2 indicating whether the audio sink device is currently being worn on a head/ears of a user. Communication module 16 may receive the signal and determine whether to disable or maintain the enabled state of the second wireless protocol based on the activity state of the media session and whether the audio sink device is currently being worn on a head/ears of the user. As one example, where the audio sink device is not currently being worn on a head/ears of the user, communication module 16 may disable the second wireless protocol in response to the request to activate airplane mode regardless of the activity state of the media session. As another example, where the audio sink device is currently being worn on a head/ears of the user, communication module 16 may selectively maintain the enabled state of the second wireless protocol in response to the request to activate airplane mode based on the activity state of the media session as discussed above (e.g., maintain the enabled state if the media session is active, has been active, and/or is predicted to be active).

Responsive to determining to disable the second wireless protocol, communication module 16 may disable the second wireless protocol (310). When the second wireless protocol is disabled, mobile computing device 2 may refrain from transmitting wireless signals using the second wireless protocol.

Responsive to determining to maintain the enabled state of the second wireless protocol, communication module 16 may refrain from disabling the second wireless protocol (312) responsive to the request to activate airplane mode. As such, mobile computing device 2 may continue to transmit wireless signals using the second wireless protocol without any additional user input needed to re-enable the second wireless protocol. In this way, where the media session is actively being used to stream media to the media sink device, a user of mobile computing device 2 may enjoy an uninterrupted media experience when airplane mode is activated.

The following numbered examples may illustrate one or more aspects of the disclosure:

Example 1. A method comprising: responsive to receiving user input to activate an airplane mode of a mobile computing device: disabling a first wireless protocol; determining, based on activity of a media session, whether to maintain an enabled state of a wireless protocol of the mobile computing device, wherein the mobile computing device is configured to stream audio data associated with the media session to an audio sink device via a second wireless protocol; and selectively maintaining the enabled state of the second wireless protocol based on the determination.

Example 2. The method of example 1, wherein determining whether to maintain the enabled state of the second wireless protocol comprises: determining to maintain the enabled state of the second wireless protocol in response to determining that a time at which the media session was last active is within a threshold time of a present time; and determining not to maintain the enabled state of the second wireless protocol in response to determining that the time at which the media session was last active is not within the threshold time of the present time.

Example 3. The method of example 2, wherein determining that the time at which the media session was last active is within the threshold time of the present time comprises determining that the media session is active at the present time.

Example 4. The method of example 1, wherein determining whether to maintain the enabled state of the second wireless protocol comprises: determining to maintain the enabled state of the second wireless protocol in response to determining that the media session is likely to be active in the near future; and determining not to maintain the enabled state of the second wireless protocol in response to determining the media session is not likely to be active in the near future.

Example 5. The method of any of examples 1-4, wherein determining whether to maintain the enabled state of the second wireless protocol comprises determining not to maintain the enabled state of the second wireless protocol in response to determining that an audio sink device is connected to the mobile computing device via a wired connection.

Example 6. The method of any of examples 1-5, wherein determining whether to maintain the enabled state of the second wireless protocol comprises: determining to maintain the enabled state of the second wireless protocol in response to determining that a time at which the mobile computing device last streamed audio data to the audio sink device via the second wireless protocol is within a threshold time of a present time; and determining not to maintain the enabled state of the second wireless protocol in response to determining that the time at which the mobile computing device last streamed audio data to the audio sink device via the second wireless protocol is not within the threshold time of a present time.

Example 7. The method of any of examples 1-6, wherein the second wireless protocol comprises a BLUETOOTH protocol.

Example 8. The method of example 7, wherein the first wireless protocol comprises one or both of a Wi-Fi protocol and/or a cellular protocol.

Example 9. The method of any of examples 1-8, further comprising: responsive to disabling the first wireless protocol, not transmitting wireless signals using the first wireless protocol; and responsive to disabling the second wireless protocol, not transmitting wireless signals using the second wireless protocol.

Example 10. A mobile computing device comprising: a communication unit; one or more processors; and at least one non-transitory computer-readable storage medium storing instructions that are executable by the one or more processors to perform the method of any combination of examples 1-9.

Example 11. A non-transitory computer-readable storage medium storing instructions that, when executed, cause a communication controller of a source device to perform the method of any combination of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
responsive to receiving user input to activate an airplane mode of a mobile computing device:
disabling a first wireless protocol;
determining, based on activity of a media session, whether to maintain an enabled state of a second wireless protocol of the mobile computing device, wherein the mobile computing device is configured to stream audio data associated with the media session to an audio sink device via the second wireless protocol; and
selectively maintaining the enabled state of the second wireless protocol based on the determination.

2. The method of claim 1, wherein determining whether to maintain the enabled state of the second wireless protocol comprises:
determining to maintain the enabled state of the second wireless protocol in response to determining that a time at which the media session was last active is within a threshold time of a present time; and
determining not to maintain the enabled state of the second wireless protocol in response to determining that the time at which the media session was last active is not within the threshold time of the present time.

3. The method of claim 2, wherein determining that the time at which the media session was last active is within the threshold time of the present time comprises determining that the media session is active at the present time.

4. The method of claim 1, wherein determining whether to maintain the enabled state of the second wireless protocol comprises:
determining to maintain the enabled state of the second wireless protocol in response to determining that the media session is likely to be active in the near future; and
determining not to maintain the enabled state of the second wireless protocol in response to determining the media session is not likely to be active in the near future.

5. The method of claim 1, wherein determining whether to maintain the enabled state of the second wireless protocol comprises determining not to maintain the enabled state of the second wireless protocol in response to determining that an audio sink device is connected to the mobile computing device via a wired connection.

6. The method of claim 1, wherein determining whether to maintain the enabled state of the second wireless protocol comprises:
determining to maintain the enabled state of the second wireless protocol in response to determining that a time at which the mobile computing device last streamed audio data to the audio sink device via the second wireless protocol is within a threshold time of a present time; and
determining not to maintain the enabled state of the second wireless protocol in response to determining that the time at which the mobile computing device last streamed audio data to the audio sink device via the second wireless protocol is not within the threshold time of a present time.

7. The method of claim 1, wherein the second wireless protocol comprises a BLUETOOTH protocol.

8. The method of claim 7, wherein the first wireless protocol comprises one or both of a Wi-Fi protocol and/or a cellular protocol.

9. The method of claim 1, further comprising:
responsive to disabling the first wireless protocol, not transmitting wireless signals using the first wireless protocol; and
responsive to disabling the second wireless protocol, not transmitting wireless signals using the second wireless protocol.

10. A mobile computing device comprising:
a communication unit;
one or more processors; and
at least one non-transitory computer-readable storage medium storing instructions that are executable by the one or more processors to:
responsive to receiving user input to activate an airplane mode of the mobile computing device:
disable a first wireless protocol;
determine, based on activity of a media session, whether to maintain an enabled state of a second wireless protocol of the mobile computing device, wherein the communication unit is configured to stream audio data associated with the media session to an audio sink device via the second wireless protocol; and
selectively maintain the enabled state of the second wireless protocol based on the determination.

11. The mobile computing device of claim 10, wherein the instructions executable by the one or more processors to determine whether to maintain the enabled state of the second wireless protocol comprise instructions executable by the one or more processors to:
determine to maintain the enabled state of the second wireless protocol in response to determining that a time at which the media session was last active is within a threshold time of a present time; and
determine not to maintain the enabled state of the second wireless protocol in response to determining that the time at which the media session was last active is not within the threshold time of the present time.

12. The mobile computing device of claim 11, wherein the instructions executable by the one or more processors to determine that the time at which the media session was last active is within the threshold time of the present time comprise instructions executable by the one or more processors to determine that the media session is active at the present time.

13. The mobile computing device of claim 10, wherein the instructions executable by the one or more processors to determine whether to maintain the enabled state of the second wireless protocol comprise instructions executable by the one or more processors to:
determine to maintain the enabled state of the second wireless protocol in response to determining that the media session is likely to be active in the near future; and
determine not to maintain the enabled state of the second wireless protocol in response to determining the media session is not likely to be active in the near future.

14. The mobile computing device of claim 10, wherein the instructions executable by the one or more processors to determine whether to maintain the enabled state of the second wireless protocol comprise instructions executable by the one or more processors to determine not to maintain the enabled state of the second wireless protocol in response to determining that an audio sink device is connected to the mobile computing device via a wired connection.

15. The mobile computing device of claim 10, wherein the instructions executable by the one or more processors to determine whether to maintain the enabled state of the second wireless protocol comprise instructions executable by the one or more processors to:
  determine to maintain the enabled state of the second wireless protocol in response to determining that a time at which the mobile computing device last streamed audio data to the audio sink device via the second wireless protocol is within a threshold time of a present time; and
  determine not to maintain the enabled state of the second wireless protocol in response to determining that the time at which the mobile computing device last streamed audio data to the audio sink device via the second wireless protocol is not within the threshold time of a present time.

16. The mobile computing device of claim 10, wherein the second wireless protocol comprises a BLUETOOTH protocol.

17. The mobile computing device of claim 16, wherein the first wireless protocol comprises one or both of a Wi-Fi protocol and/or a cellular protocol.

18. The mobile computing device of claim 10, further comprising instructions executable by the one or more processors to:
  not transmit, responsive to disabling the first wireless protocol, wireless signals using the first wireless protocol; and
  not transmit, responsive to disabling the second wireless protocol, wireless signals using the second wireless protocol.

19. A non-transitory computer-readable storage medium storing instructions that, when executed, cause a communication controller of a mobile computing device to
  responsive to receiving user input to activate an airplane mode of the mobile computing device:
    disable a first wireless protocol;
    determine, based on activity of a media session, whether to maintain an enabled state of a second wireless protocol of the mobile computing device, wherein the mobile computing device is configured to stream audio data associated with the media session to an audio sink device via the second wireless protocol; and
    selectively maintain the enabled state of the second wireless protocol based on the determination.

20. The non-transitory computer-readable storage medium of claim 19, wherein the instructions to determine whether to maintain the enabled state of the second wireless protocol comprise instructions to:
  determine to maintain the enabled state of the second wireless protocol in response to determining that a time at which the media session was last active is within a threshold time of a present time; and
  determine not to maintain the enabled state of the second wireless protocol in response to determining that the time at which the media session was last active is not within the threshold time of the present time.

* * * * *